United States Patent
Dudek

(10) Patent No.: US 8,651,494 B2
(45) Date of Patent: Feb. 18, 2014

(54) SPLIT SEAL ASSEMBLY AND METHOD

(75) Inventor: David M. Dudek, Palatine, IL (US)

(73) Assignee: John Crane Inc., Morton Grove, IL (US)

( * ) Notice: Subject to any disclaimer, the term of this patent is extended or adjusted under 35 U.S.C. 154(b) by 462 days.

(21) Appl. No.: 13/047,485

(22) Filed: Mar. 14, 2011

(65) Prior Publication Data

US 2011/0221136 A1  Sep. 15, 2011

Related U.S. Application Data

(60) Provisional application No. 61/313,975, filed on Mar. 15, 2010.

(51) Int. Cl.
  *F16J 15/34*  (2006.01)
  *F16J 15/38*  (2006.01)

(52) U.S. Cl.
  USPC ........... 277/306; 277/370; 277/372; 277/390; 277/392

(58) Field of Classification Search
  USPC .......... 277/306, 370, 371, 372, 373, 390, 392
  See application file for complete search history.

(56) References Cited

U.S. PATENT DOCUMENTS

| | | | |
|---|---|---|---|
| 4,576,384 A | | 3/1986 | Azibert |
| 4,586,719 A | * | 5/1986 | Marsi et al. ............. 277/385 |
| 5,076,589 A | * | 12/1991 | Marsi ..................... 277/394 |
| 5,354,070 A | * | 10/1994 | Carmody ................ 277/370 |
| 5,490,682 A | | 2/1996 | Radosav et al. |
| 5,529,315 A | | 6/1996 | Borrino et al. |
| 5,556,110 A | * | 9/1996 | Marsi et al. ............. 277/397 |
| 5,571,268 A | | 11/1996 | Azibert |
| 5,662,340 A | | 9/1997 | Bessette et al. |
| 5,713,576 A | | 2/1998 | Wasser et al. |
| 5,913,521 A | | 6/1999 | Sangren et al. |
| 5,961,122 A | | 10/1999 | Marsi |
| 5,967,525 A | | 10/1999 | Sandgren et al. |
| 6,386,547 B2 | | 5/2002 | Wu et al. |
| 6,485,023 B2 | | 11/2002 | Budrow et al. |

(Continued)

OTHER PUBLICATIONS

U.S. Patent & Trademark Office, International Search Report in International Patent Application No. PCT/US2011/28362 (May 9, 2011).

(Continued)

*Primary Examiner* — Vishal Patel
(74) *Attorney, Agent, or Firm* — Leydig, Voit & Mayer Ltd

(57) ABSTRACT

A split mechanical end face seal assembly has a split gland plate assembly, a split mating seal ring assembly, a split primary seal ring assembly and a split biasing assembly. The segmented mating seal ring is axially and radially supported on the segmented mating ring adapter by resilient connector strips as pre-assembled sub-assemblies and the resilient connector strips axially non-rigidly support the mating seal ring within said mating ring adapter assembly. An axially movable primary sealing ring assembly includes a segmented primary seal ring. The biasing assembly is pre-assembled into the gland plate assembly and urges the primary seal ring into sealing relation with the mating seal ring. A method of installation includes resilient axial and radial support of the mating seal ring segments in mating ring adapter segments by the resilient connector strip for installation as a pre-assembled sub-assembly. It further includes pre-assembly of semi-circular shaped biasing ring segments into segments of the gland plate assembly.

17 Claims, 9 Drawing Sheets

(56) References Cited

U.S. PATENT DOCUMENTS 6,485,024 B1    11/2002    Pippert et al.
6,561,515 B1    5/2003    Bjornson
7,252,291 B2    8/2007    Khonsari et al.

OTHER PUBLICATIONS

U.S. Patent & Trademark Office, Written Opinion in International Patent Application No. PCT/US2011/28362(May 9, 2011).

* cited by examiner

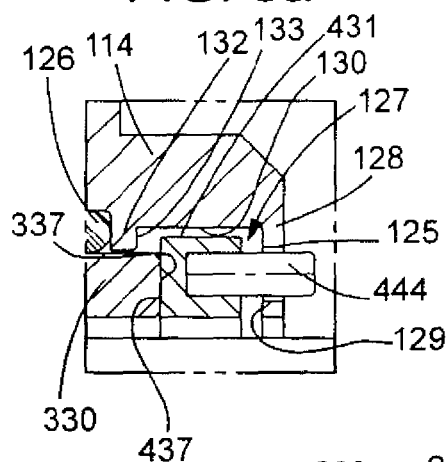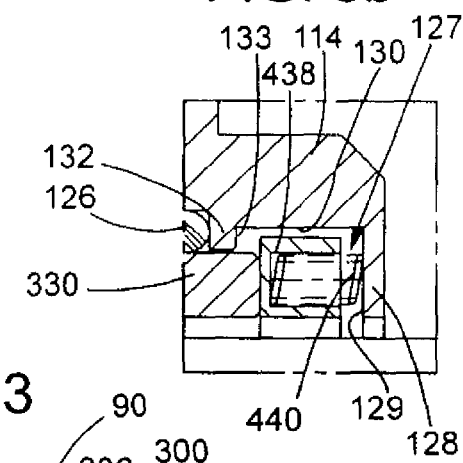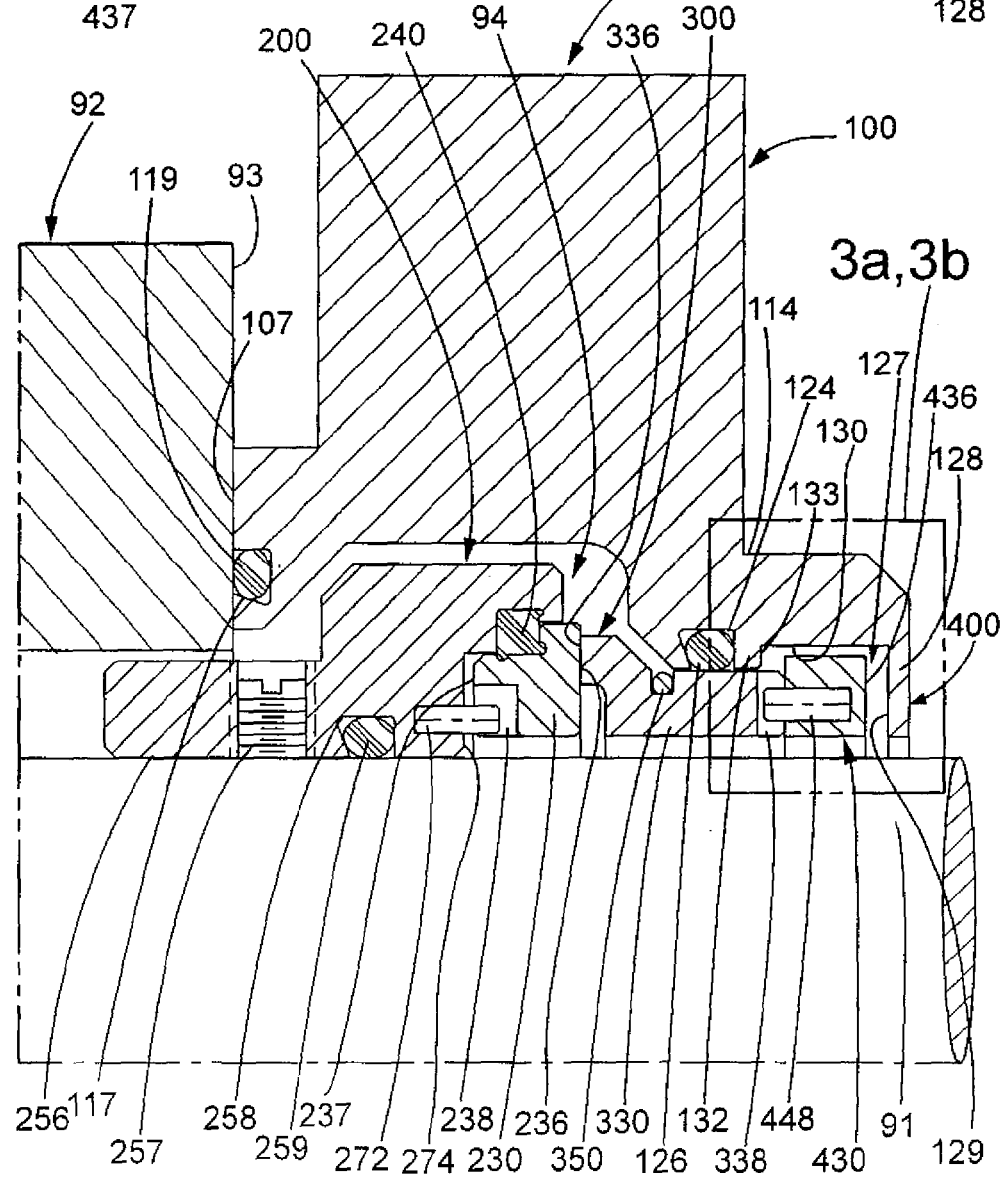

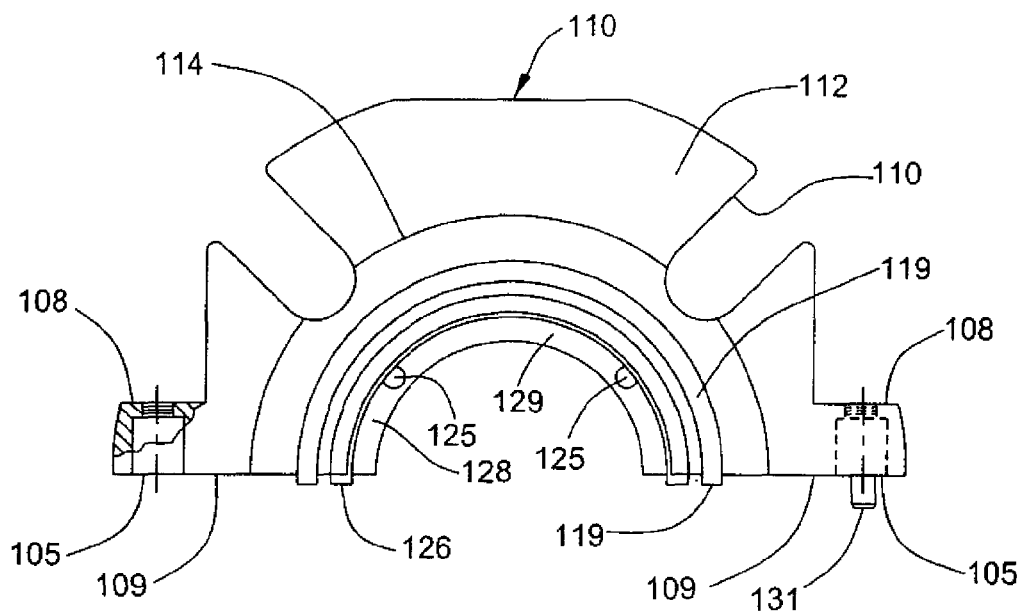
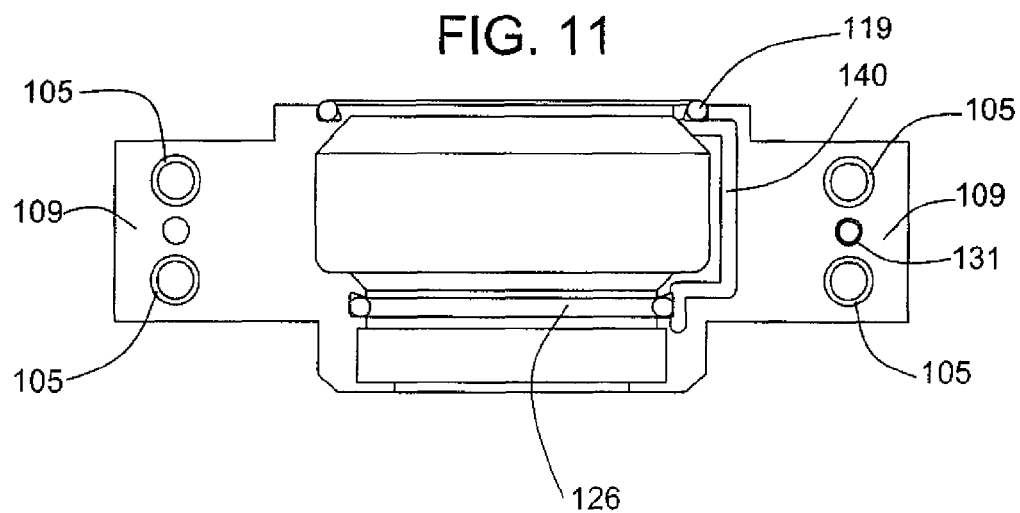

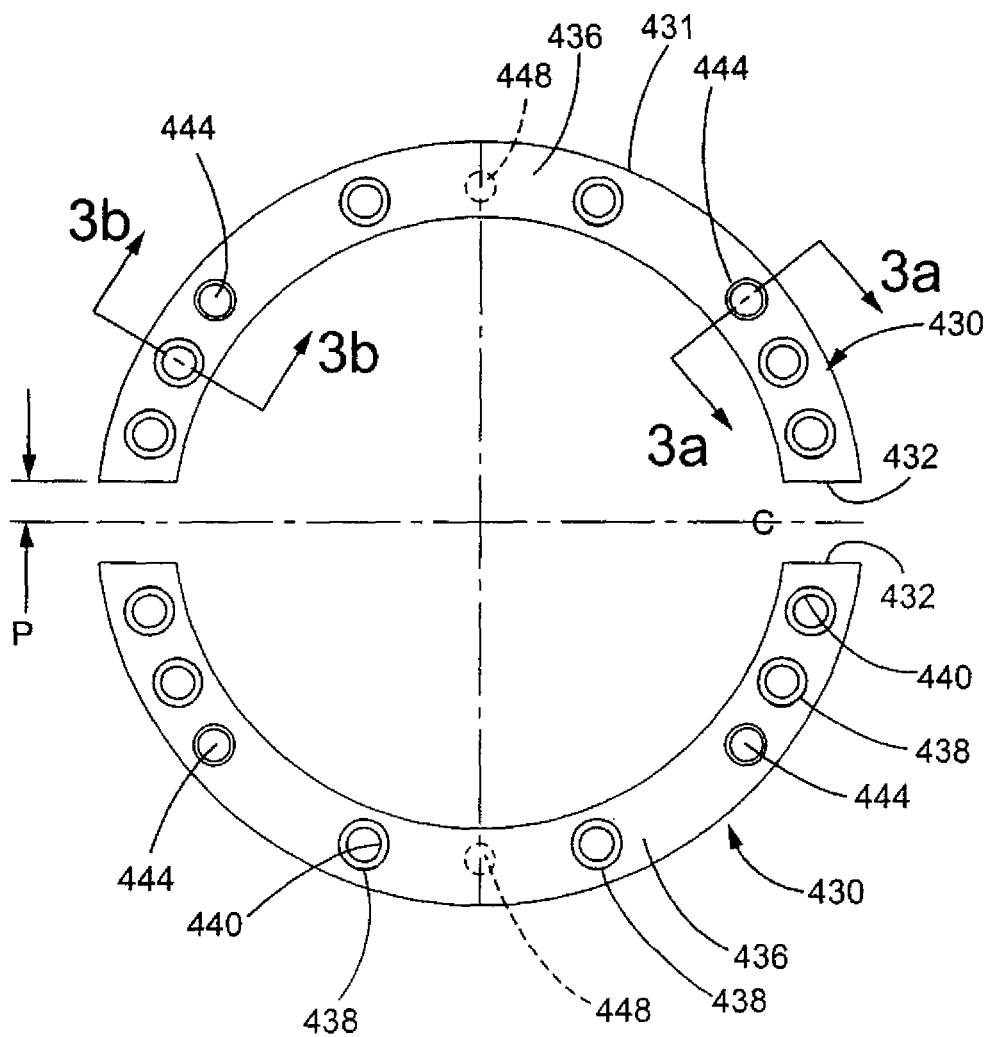

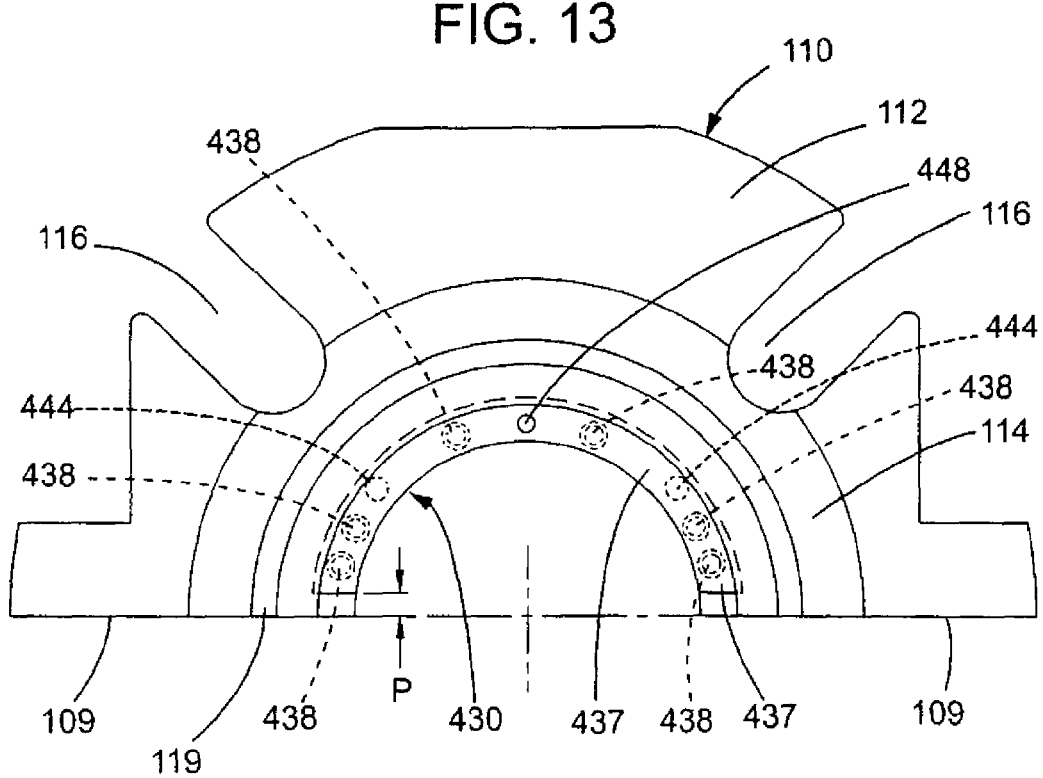

SPLIT SEAL ASSEMBLY AND METHOD

CROSS-REFERENCE TO RELATED APPLICATIONS

This application claims priority pursuant to Title 35 USC §119 to U.S. Provisional Patent Application Ser. No. 61/313,975, filed Mar. 15, 2010, entitled "Split Seal Arrangement" which is incorporated by reference in its entirety.

TECHNICAL FIELD

This disclosure relates generally to sealing arrangements for rotating equipment. More particularly, it relates to a split mechanical end face seal assembly to retain fluid from passing between a housing and a rotating shaft and to the method of installation of the split mechanical end face seal assembly between the housing and the rotatable shaft.

BACKGROUND

Mechanical end face seal assemblies for sealing rotating shafts such as those found, for example, between the impeller shaft and the housing of a pump, are known. In some applications, such seal assemblies are installed, replaced, and serviced in the field where the free end of the rotatable shaft is not accessible, for example, because it is connected to a motor or another prime mover operating the rotatable shaft.

To enable the installation, service, or replacement of sealing components in these environments, fully split mechanical end face seal arrangements have been created. These fully split mechanical end face seal arrangements typically include two split, relatively rotating, seal face defining rings. The rings have sliding radial faces arranged in facing, sealing relation. One of the rings, typically axially stationary, is referred to as the mating ring. It may be connected to the rotating shaft and configured to rotate with it. The second ring, which is axially movable, commonly referred to as the primary ring, may be contained in a stationary housing in the form of a gland plate surrounding the shaft where it exits the housing. The two rings are brought into contact with one another by an axial preload component to provide a sliding seal between the relatively rotating faces. The mating and primary seal rings as well as all associated surrounding and supporting components are split, typically in a diametrical fashion, to enable installation around the rotatable shaft without the need for access to the free end of the shaft.

Examples of known fully split seal configurations can be seen in U.S. Pat. Nos. 5,662,340; 5,961,122; 6,485,023 and others. Such seals include split seal face defining rings in semi-circular segments, associated semi-circular carriers for the primary and mating rings, secondary seals, usually elastomeric rings or strips between the rings and carriers, and a preloading element of semi-circular segments which axially urges the primary ring into facing sealing relation with the axially stationary mating ring. The seal components are disposed within a gland plate secured to the housing in surrounding relation to the shaft and provide the fluid sealing function.

The components including the mating and primary seal face defining rings are diametrically split into halves or segments. The seal face defining ring halves are typically preassembled into carriers, sometimes referred to as adapters, that retain the face defining ring segments until the seal arrangement is installed and secured to the rotatable shaft and to the housing. Commonly, pins, connected to the carriers, prevent the ring halves from falling out of the associated carrier before, and during installation and completion of the assembly process.

Even though the above-mentioned examples of split seal assemblies are effective in providing a seal arrangement that can be assembled around a shaft without access to the free end of the shaft they suffer from certain important drawbacks. One such drawback is the need for the use of adhesive to retain the various resilient elastomeric seal elements in place prior to completion of installation and assembly of the split mechanical end face seal assembly between a housing and shaft. Another is the inability of the installer to visually inspect the face contact between the two face defining seal rings during installation. The incorporation of the seal ring halves into cartridges results in the sealing engagement of the ring seals being concealed from view during installation.

Additionally, the known designs rely on the proper, final positioning of each seal ring segment relative to the assembled cartridge to occur during installation as the cartridges are placed around the rotatable shaft and the two halves joined together. While the proper positioning of the rings under such conditions is typically likely, any intrusion of debris between the seal ring segment and its cartridge that goes unnoticed by the installer may cause misalignments in the finished seal assembly, which may affect performance and durability.

It is also the case in existing split mechanical end face seal assemblies having pre-assembled components such as mating ring carrier segments with attached mating ring segments and primary ring carrier segments with attached primary ring segments in which the seal ring segments are rigidly supported within their respective carriers. Thus, the advantages derived from axial non-rigid support of the seal face defining segments are not attainable.

SUMMARY

The split mechanical end face seal assembly of the present disclosure provides an arrangement in which the shortcomings of the known seals are overcome. The disclosed split mechanical end face seal assembly includes a pre-assembled mating ring assembly in which a resilient connector strip resiliently retains each segment of the mating seal ring relative to its associated carrier providing axial and radial support prior to installation. The resilient connector strip provides axial non-rigid support for the mating seal ring within the assembled mechanism. Moreover, the primary ring segments are separately assembled about the rotatable shaft without a separate carrier element to enable the visual inspection by the installer of the interface with the mating ring. In this way, alignment issues associated with a blind installation are avoided. Moreover, no adhesive is used, or necessary, to affix preassembled components in the split mechanical end face seal assembly of the present disclosure.

BRIEF DESCRIPTION OF THE DRAWINGS

FIG. 3 is a partial view, in cross section, of the split mechanical end face seal assembly shown in FIG. 2 taken along the line 3-3 of FIG. 2.

FIG. 3a is a revolved fragmentary cross-sectional side view of a portion of the apparatus of FIG. 3, taken along the line 3a-3a of FIG. 12 showing particular details of the biasing assembly.

FIG. 3b is a revolved fragmentary cross-sectional side sectional view of a portion of the apparatus of FIG. 3, taken along the line 3b-3b of FIG. 12 showing other particular details of the biasing assembly.

FIG. 10 is a partially broken away plan view of a gland plate segment from an inboard perspective in accordance with the disclosure.

FIG. 11 is an end view of a gland plate segment in accordance with the disclosure.

FIG. 12 is a plan view of the biasing ring segments of the split mechanical end face seal assembly of the disclosure.

FIG. 13 is a partial plan view of the gland plate assembly of the disclosure from an inboard perspective.

DETAILED DESCRIPTION

Figure 1:
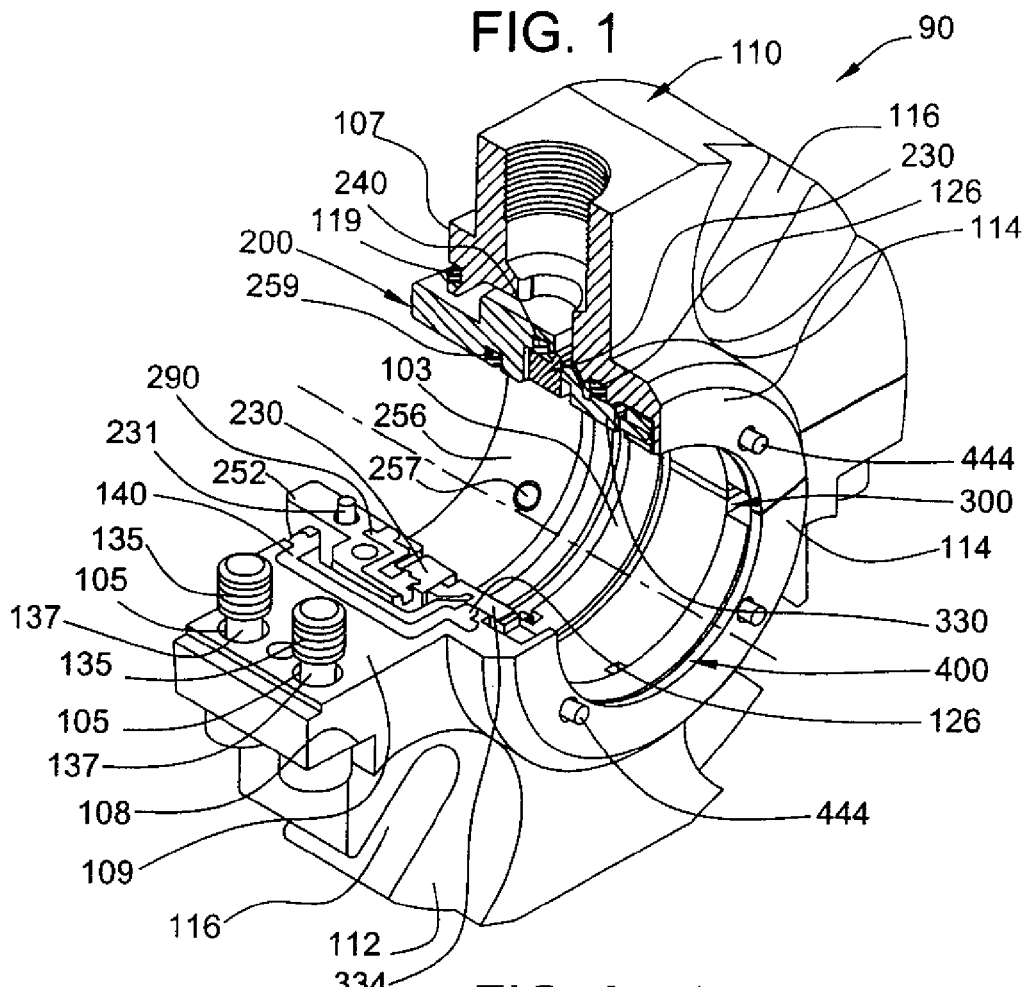
FIG. 1 is a cutaway perspective view of a split mechanical end face seal assembly in accordance with the disclosure.
Figure 2:
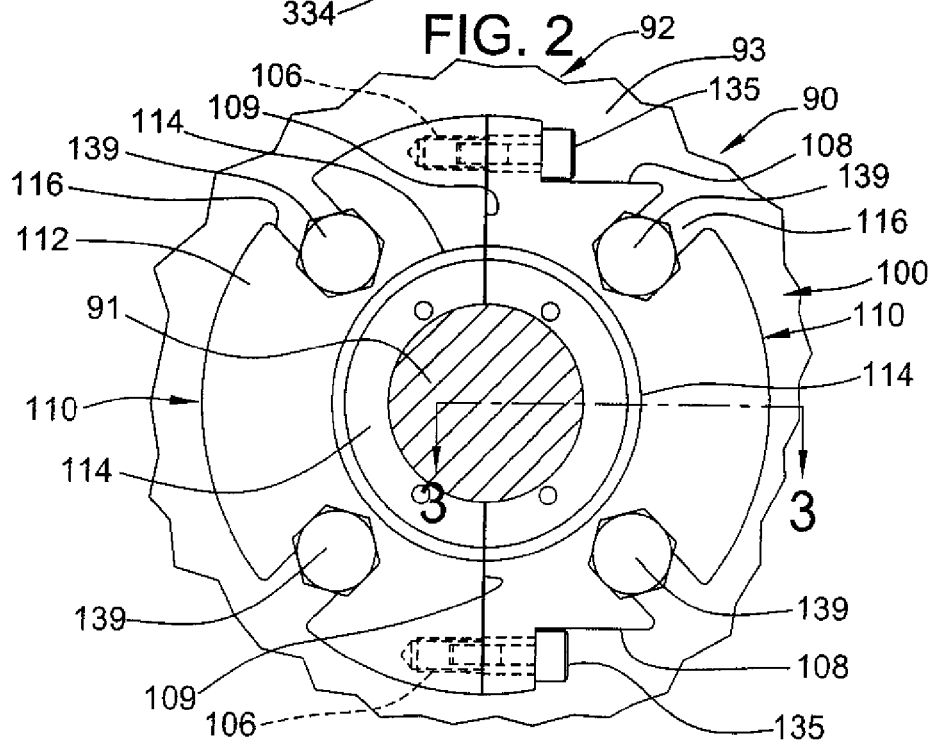
FIG. 2 is a front view, from an outboard perspective, of the split mechanical end face seal assembly shown in FIG. 1 installed between a housing and shaft.

The split mechanical end face seal assembly generally designated 90, is illustrative of, and embodies features, advances and advantages of the present disclosure. A breakaway perspective view of the split mechanical end face seal assembly 90 is shown in FIG. 1, a front view, from an outboard perspective, is shown in FIG. 2 and a partial side sectional view is shown in FIG. 3. Specific configurations and relationships of the assembly components are shown for further clarity in the additional figures.

As illustrated, split mechanical end face seal assembly 90 is installed to provide a fluid tight seal for a rotatable shaft 91 extending through a housing 92 at outboard face 93. The housing 92 may comprise a pump having a rotatable impeller (not shown) to pressurize a liquid within the housing. In this disclosure, the term inboard means toward interior of the housing and outboard means toward the exterior of the housing. Similarly, inner, or inward means radially toward the longitudinal centerline of the seal assembly and outer, or outward means radially away from the longitudinal centerline.

It is also important to recognize that throughout the description components described as annular, or identified as rings, are actually split along a diametric line and are formed of two semi-circular segments. Similarly, certain elastomeric components may be described as rings but are actually linear segments with abutting ends and curved into semi-circular shape to cooperatively form a circular seal ring configuration.

The split mechanical end face seal assembly 90 includes a gland plate assembly 100, a mating ring assembly 200, a primary ring assembly 300 and a biasing assembly 400. As seen in FIG. 3, gland plate assembly 100 is secured along its inboard face 107 to outboard face 93 of the housing 92 surrounding shaft 91. Gland plate assembly 100 defines an annular seal chamber 94 surrounding the shaft 91 within which the components of the assembled seal operate.

The gland plate assembly 100 includes a gland plate segments 110 split with facing transverse ends 109 that abut at an interface. Segments 110 each include flange portion 112 and a body portion 114. One of the segments 110 includes a milled step 108 adjacent transverse ends 109. Best seen in FIGS. 1 and 2, that segment 110 includes threaded holes with unthreaded counter bores 105 open at each transverse end 109. The other one of gland plate segments 110 include threaded holes 106 aligned with the counterbores 105 when the segments 110 are positioned with transverse ends 109 in abutment. Securement bolts 135, with unthreaded shanks 137 are threaded through the holes of the first segment. The bolts 135 reside with the threaded ends in the unthreaded counterbores 105 until used to connect the gland plate segments 110 together. They are then threaded into the aligned threaded holes 106 in the other segment 110 to secure the segments together to form the gland plate assembly 110. A dowel pin 131, seen in FIGS. 10 and 11, is secured in one transverse end 109 of each gland plate segment 110. It engages a mating hole in the transverse end 109 of the other gland plate segment 110 to assure alignment of the segments.

The flange portion 112 of each gland plate segment 110 has slots 116 through which bolts 139 or other fasteners extend to connect the split mechanical end face seal assembly 90 to the housing 92 at mounting face 93. The inboard face 107 of body portion 114 of each gland plate segment 110 includes a semi-circular sealing groove 117 which receives an O-ring shaped elastomeric sealing strip 119 which is compressed into fluid tight contact with outboard mounting face 93 of housing 92. Notably semi-circular sealing groove 117 has a tapered cross-section such that its opening is somewhat smaller than the outer diameter of the O-ring type sealing strip 119. This relationship causes the strip 119 to be retained within the groove 117.

As seen in FIGS. 3 and 11, a semi-circular seal ring groove 124 in body portion 114 of each gland plate segment 110 is open to the seal chamber 94. An O-ring shaped elastomeric sealing strip 126 is provided in groove 124. Sealing strip 126 provides the secondary seal between axially moveable primary ring assembly 300 and gland plate assembly 100 as will be explained. As in the instance of the groove 117, the entrance into groove 124 is smaller than the diameter of O-ring shaped sealing strip 126 to retain the strip within groove 124.

As illustrated in FIG. 10, O-ring type sealing strip 119 is somewhat longer than the semi-circular extent of groove 117. The extending ends are compressed together on joinder of the gland plate segments 110. The strip 126 is somewhat longer than the semi-circular extent of groove 124. The extending ends are compressed together on joinder of the gland plate segments 110 to form a fluid tight seal.

Notably, as shown in FIG. 11, one transverse end 109 of each gland plate segment 110 is provided with a resilient seal element 140 in an appropriately formed groove. It may be molded as an integral part of elastomeric sealing strip 119, elastomeric sealing strip 126, or both. One such seal element 140 is provided in each segment 110 on one transverse face. On connection of segments 110, it seals against the opposing face of the transverse end 109 of the other segment.

Body portions 114 of gland plate segments 110 define a biasing chamber portion 127 of the seal chamber 94 which contains biasing assembly 400. A radial annular wall 128 defines the outboard extent of the gland plate segments 110. With segments 110 assembled together, radial annular wall 128 defines an inboard facing, radial annular, inboard facing reaction surface 129 against which biasing assembly 400 acts to urge primary ring assembly 300 toward mating ring assembly 200.

Biasing chamber portion 127 includes axial cylindrical wall 130 extending between radial annular wall 128 and radial annular ledge 132 spaced outboard from semi-circular seal ring groove 124. This ledge provides a radial abutment surface 133 against which biasing assembly 400 is urged prior to completion of installation of gland plate assembly 100 onto outboard mounting face 93 of housing 92.

Radial wall 128 of each segment 110 includes two holes 125 seen in FIGS. 3a and 10 each positioned on a radial line about thirty degrees (30°) from a transverse end 109. In a completely assembled split mechanical end face seal assembly 90 holes 125 cooperate with elements of the biasing assembly 400 to resist rotation of the primary ring assembly 300.

Figure 6:
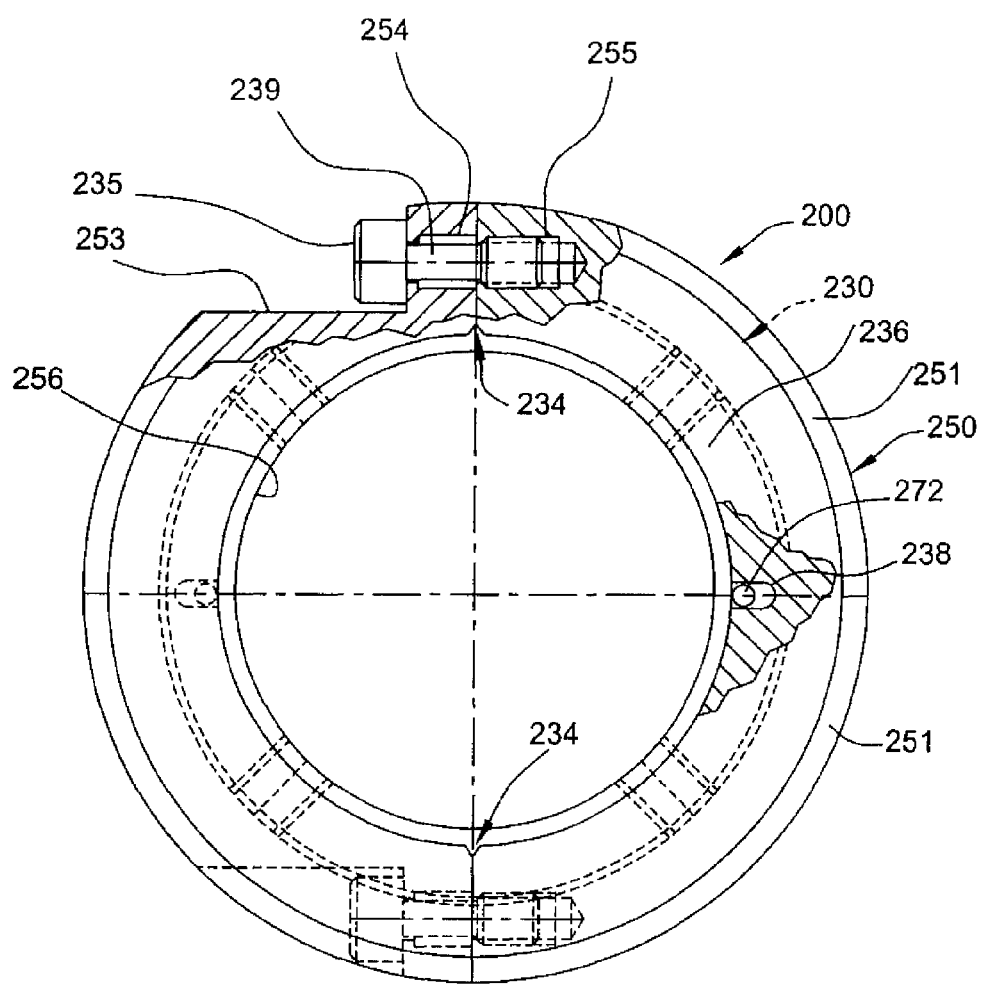
FIG. 6 is a plan view, partially broken away, of the mating ring adapter assembly from an outboard perspective in accordance with the disclosure.
Figure 7:
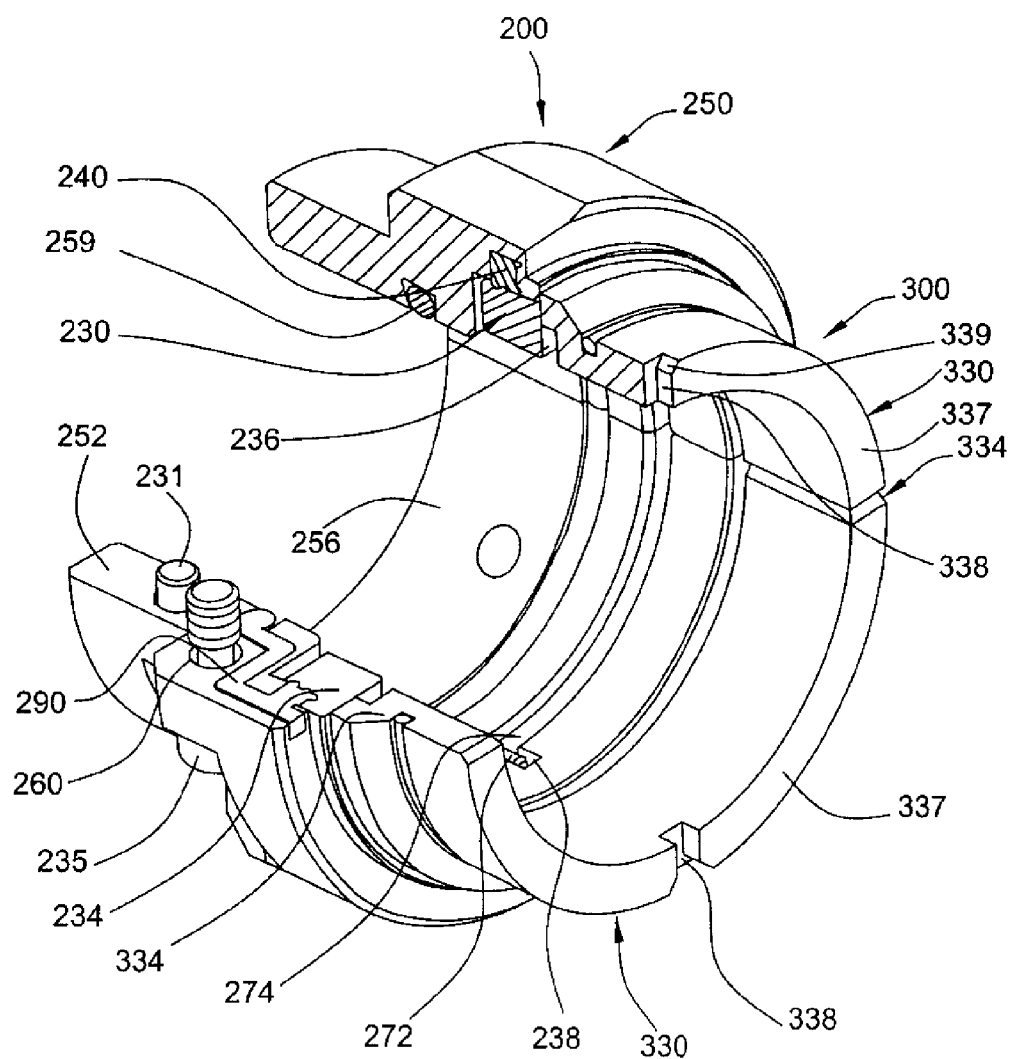
FIG. 7 is a cutaway perspective view of a mating ring assembly and primary ring assembly of the split mechanical end face seal of the disclosure.

Referring now to FIGS. 1 and 3 and in particular to FIGS. 6 and 7, mating ring assembly 200 is secured for rotation with the shaft 91. It includes diametrically split seal face defining mating seal ring 230 resiliently, or axially non-rigidly supported within mating ring carrier or adapter assembly 250 upon resilient connector strip 240. The face defining seal ring segments may be made of silicon carbide or ceramic, depending on the particular sealing application.

Mating seal ring 230 is sized to freely surround the shaft 91 and is fractured into two-semi-circular segments with radial ends engaged along interface 234. The joined ring segments form an outboard facing continuous radial annular sealing face 236. On the opposite, inboard radial face 237, each of the segments of mating seal ring 230 includes radial slot 238, best seen in FIGS. 3 and 6. It is located midway between engaged ends at interface 234.

Figure 4:
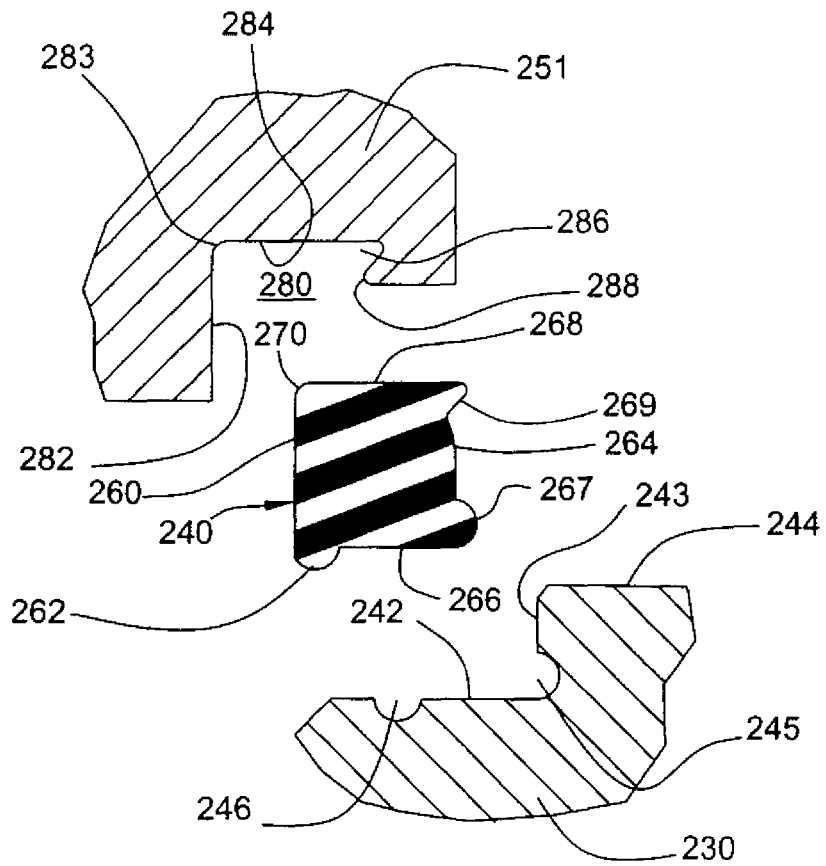
FIG. 4 is a fragmentary, exploded cross sectional view, on an enlarged scale, of a portion of the mating ring adapter assembly, mating seal ring and resilient connector strip in accordance with the disclosure.
Figure 5:
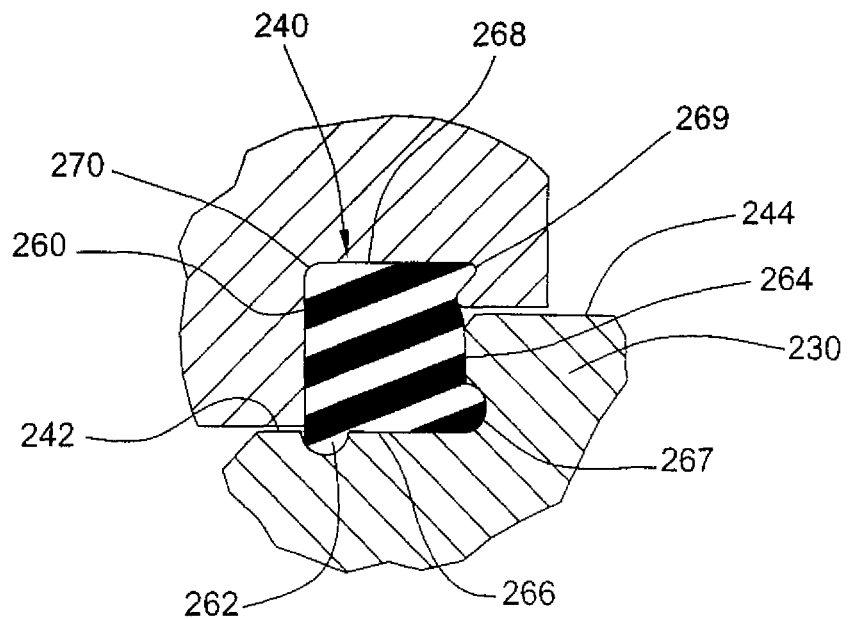
FIG. 5 is a fragmentary cross sectional view, on an enlarged scale, of the components shown in FIG. 4 in an assembled condition.

Best seen in FIGS. 4 and 5, mating seal ring 230 includes an outward axial cylindrical surface 242. It further defines an inboard facing radial annular surface 243 and an outermost axial cylindrical surface 244. Outward axial cylindrical surface 242 is joined to inboard facing radial annular surface 243 by an outboard directed radial capture groove 245. An inward directed axial capture groove 246 extends radially inward from outward axial cylindrical surface 242 inboard from outboard directed radial capture groove 245.

Mating ring carrier or adapter assembly 250 is a metal support component that houses the segmented mating seal ring 230. It is formed of semi-circular segments 251 with transverse ends 252. As best seen in FIG. 6, one of the mating ring adapter segments 251 includes a milled step 253 adjacent transverse ends 252. That segment 251 includes a threaded hole with an unthreaded counterbore 254 open at each transverse end 252. The other mating ring adapter segment includes a threaded hole 255 aligned with the counterbores 254 when the segments 251 are positioned with transverse ends 252 in abutment. A securement bolt 235 with unthreaded shank 239 is threaded through the holes of the segment 251 having unthreaded counterbores 254. The threaded ends of the bolts reside in the unthreaded counterbores 254 until used to connect the mating ring adapter segments 251 together. They are then threaded into the aligned threaded holes 255 in the other segment 230 to secure the segments together to form a unitary mating ring adapter assembly 250. A dowel pin 231, seen in FIG. 1, secured in one transverse facing end 252 of each mating ring adapter segment 251 engages a mating hole in the transverse facing end 252 of the other mating ring adapter segment 251 to assure alignment of the segments.

When so joined, mating ring adapter assembly 250 is generally annular and defines an inner bore 256 closely sized to the outer diameter of shaft 91. Each mating ring adapter segment 251 includes radial threaded holes with set screws 257 to secure the mating ring adapter assembly 250 to the shaft 91 for rotation with the shaft. Each mating ring adapter segment 251 includes radial groove 258 at inner bore 256. An O-ring shaped elastomeric seal strip 259 in seal groove 258 provides a fluid tight relationship with the outer surface of shaft 91. The groove 258 has a tapered cross-section similar to the groove 117 of gland plate segments 110 to retain seal strip 259 in place. That is, its opening is somewhat smaller than the outer diameter of the strip 259. The strip 259 is also somewhat longer than the semi-circular extent of the groove 258 in each segment 251 of mating ring adapter assembly 250. The extending ends are compressed together on joinder of the segments 251 with bolts 235 to form a fluid tight seal.

As seen in FIGS. 1 and 7, the interface 234 between transverse ends 252 of mating ring adapter segments 251 is provided with a resilient elastomeric seal element 290. One such seal element 290 is provided in each segment 230 on one facing transverse end 252 in an appropriately formed groove. It may be molded as an integral part of elastomeric sealing strip 259, resilient connector strip 240 or both. On connection of the segments 230, it seals against the opposing facing transverse end 252 of the other mating ring adapter segment 251.

Mating ring adapter assembly 250 defines an outboard facing counterbore that receives mating seal ring 230 in an axially non-rigid supporting relation. It includes outboard facing radial wall 274. Best seen in FIGS. 1 and 6 to 8, an axial pin 272 extends in the outboard direction from radial wall 274. Each axial pin 272 is disposed in a radial slot 238 in a segment of mating seal ring 230 and provides driving engagement between mating ring adapter assembly 250 and mating seal ring 230. The axial pin 272 is positioned midway between transverse facing ends 252 of each segment 251 of mating ring adapter assembly 250. Thus, each segment of mating seal ring 230 engages with a pin 272 of a segment of mating ring adapter assembly 250. Notably the radial slots 238 are substantially longer, in the radial direction, than the diameter of axial pin 272 providing ample clearance in the radial direction. Pins 272 thus engage the segments of mating seal ring 230 only along radial sidewalls of the slots 238.

Mating ring adapter segments 251 each include a semi-circular retention groove 280 to contain resilient connector strip 240. Best seen in FIGS. 3 to 5, the retention groove 280 is formed in mating ring adapter segments 251 radially outward of the outboard facing counter bore that receives mating seal ring 230. Thus, resilient connector strip 240 resides radially outward of radial outward axial cylindrical surface 242 of mating seal ring 230.

Referring to FIG. 4, the retention groove 280 is defined by outboard facing radial annular wall 282 and axially extending semi-cylindrical wall 284 joined at radiused corner 283. The outboard end of retention groove 280 at axially extending semi-cylindrical wall 284 includes a outboard notch 286 defined by semi-circular shoulder 288.

The individual segments of mating seal ring 230 each reside within the outboard facing mating ring counterbore defined by a segment 251 of the mating ring adapter assembly 250 with the fractured ends of the segments of mating seal ring 230 aligned with the transverse facing ends 252 of the mating ring adapter segments 251. The outboard axial cylindrical surface 242 and outermost axial cylindrical surface 244 of mating seal ring 230 are sized to provide a slight clearance relative to the outboard facing mating ring counterbore such that each segment of mating seal ring 230 is axially non-rigidly supported within each mating ring adapter segment 251 by resilient connector strip 240. Moreover, each segment of mating seal ring 230 is resiliently axially and radially supported in its associated mating ring adapter segment 251 as a pre-assembled sub-assembly by resilient connector strip 240.

Figure 8:
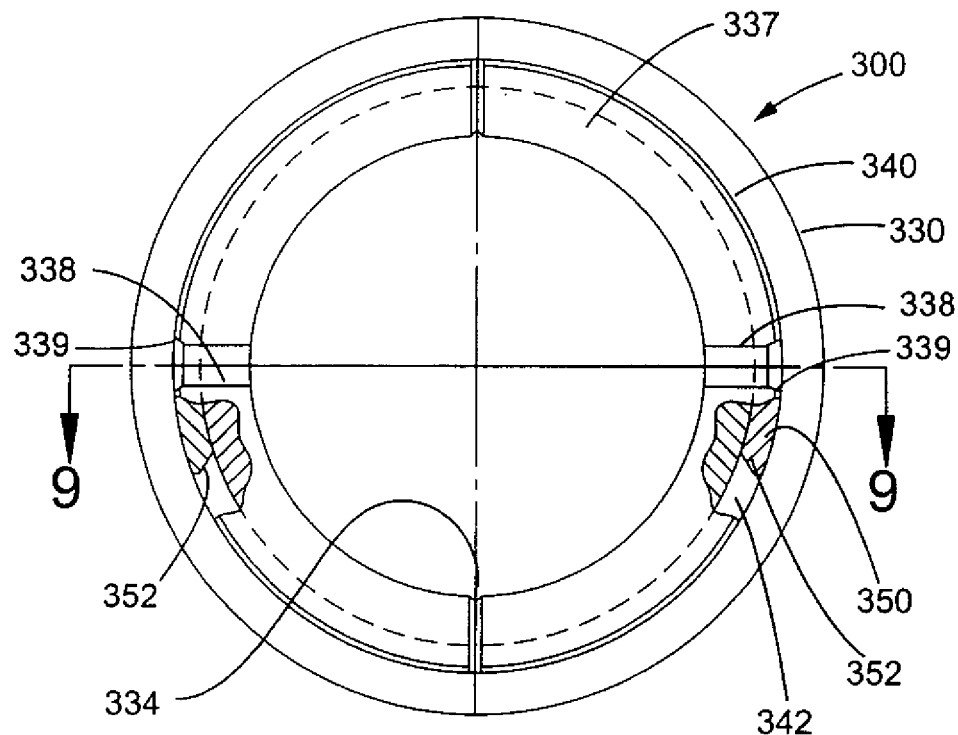
FIG. 8 is a plan view, partially in section, of a primary ring assembly from an outboard perspective in accordance with the disclosure.
Figure 9:
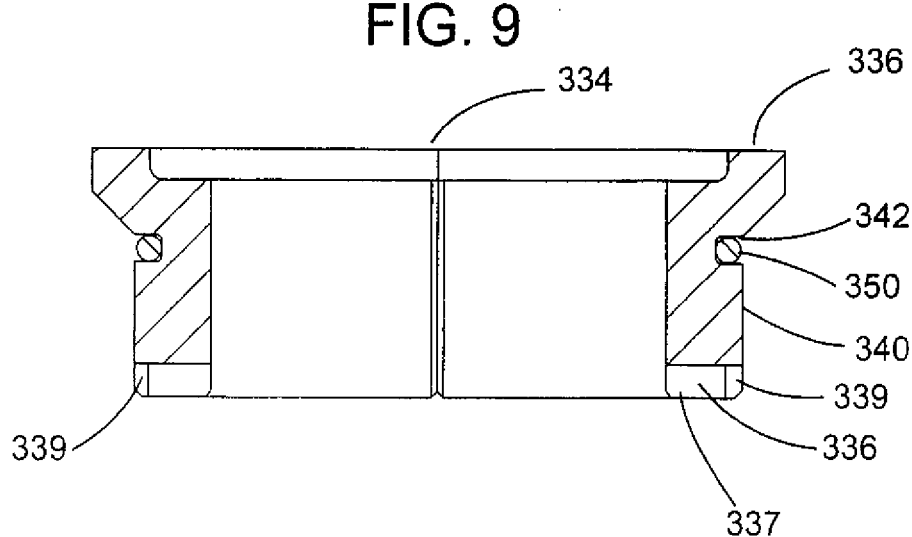
FIG. 9 is a cross section of the primary ring assembly of FIG. 9 taken along the line 9-9 of FIG. 8.

Primary seal ring assembly 300 is best seen in FIGS. 8 and 9. It includes primary seal ring 330 sized to freely surround shaft 91. It is fractured into two-semi-circular segments with radial ends engaged along an interface 334. The joined segments form an inboard facing continuous radial annular sealing face 336. The opposite outboard annular face 337 each of the segments of primary seal ring 330 includes a radial slot 338 with a chamfer 339 at its radially outward end. It is located midway between engaged ends at interface 334.

The segments of primary seal ring 330 define a radially outer axially extending cylindrical seal surface 340. It provides a surface for sliding sealing engagement of O-ring shaped sealing strip 126 on gland plate assembly 100 to centrally support primary ring assembly 300 about shaft 91. The face defining ring segments of primary seal ring 330 may be made of silicon carbide or carbon depending on the particular sealing application. Ceramic material for mating seal ring 230 and carbon materials for primary seal ring 330 is a combination particularly suitable for dry running applications such as in mixer vessels.

A radially inward groove 342 surrounds primary seal ring 330 at the inboard end of cylindrical seal surface 340. As seen in FIGS. 8 and 9, primary seal ring assembly 300 includes a retainer ring 350 that releasably secures the segments of primary seal ring 330 together in an annular configuration. It is generally semi-circular, but forms a segment of a circle somewhat larger than a semi-circle. That is, its ends 352 are spaced closer together than the inner diameter of groove 342. Ends 352 of retainer ring 350 are shaped with inner edges that extend outward. This shape facilitates insertion of retaining ring 350 within radial groove 342 to secure together the segments of primary seal ring 330.

Shown in FIGS. 3, 12 and 13, biasing assembly 400 resides in biasing chamber portion 127 of the body portion 114 of gland plate assembly 100. With the split mechanical end face seal assembly 90 in place between housing 92 and shaft 91 it provides an axial force upon primary seal ring 330 urging inboard facing radial annular seal face 336 into relatively rotating sealing relation with outboard facing radial annular seal face 236 of mating seal ring 230.

Referring, in particular, to FIGS. 12 and 13, biasing assembly 400 includes a pair of generally semi-circular shaped biasing ring segments 430 formed with transverse ends 432. Each biasing ring segments 430 each include an outer axial surface 431 formed on a radius slightly smaller than axial cylindrical wall 130 of annular biasing chamber portion 127 of gland plate assembly 100.

As seen in FIG. 12, the biasing ring segments 430 are somewhat truncated and the transverse ends 432 are spaced a distance designated "P" in FIG. 12 from an imaginary transverse centerline "C" of the circle formed by the outer axial surface 431 of the biasing ring segments 430 in their assembled condition within biasing chamber portion 127 of body portion 114 of each gland plate segment 110.

Biasing ring segments 430 include an outboard facing radial wall 436 that faces radial annular inboard facing reaction surface 129 of radial annular wall 128, and an inboard facing radial wall 437. The axial spacing between radial annular wall 128 of biasing chamber 127 and ledge 132 is greater than the axial extent of biasing ring segments 430 between inboard facing radial wall 437 and outboard facing radial wall 436. Biasing ring segments 430 are therefore axially moveable within biasing chamber 127.

Each biasing ring segment 430 includes a plurality of spring pockets 438 seen in FIGS. 3b and 12, open toward reaction surface 129 of radial annular wall 128. A plurality of axial compression coil springs 440 each extend between the bottoms of spring pockets 438 and reaction surface 129 urging inboard facing radial wall 437 of each biasing ring segment 430 into abutting relation with radial abutment surface 133 of annular ledge 132.

As best seen in FIG. 3a, two retention pins 444 extend outboard of outboard facing radial wall 436 of each biasing ring segment 430. Pins 444 are slidably disposed within holes 125 of radial annular wall 128 body portion 114 of gland plate segments 110 to support the biasing ring segments 430 within the associated gland plate segment 110 of gland plate assembly 100. The pins 444 and holes 125 are positioned such that each biasing ring segment 430 is supported within the biasing chamber portion 127 with the outer axial surface 431 closely spaced to the axial cylindrical wall 130 of the biasing chamber 127.

The transverse ends 432 of each of the biasing ring segments 430 are generally parallel to the interface of the transverse ends 109 of the gland plate segments 110. In this relationship, the biasing ring segments 430 are positioned such that the axial force of compression coil springs 440 urges inboard facing radial wall 437 into abutting facing relation with radial abutment surface 133 of radial annular ledge 132 within biasing chamber portion 127 of seal chamber 127 defined by gland plate assembly 100. In this condition, the biasing ring segments 430 are each retained within one of the gland plate segments 110 forming a pre-assembled sub-assembly for installation of the split mechanical end face seal assembly 90.

Because of the relative diameter defined by the outer axial surface 431 of a biasing ring segment 430 and the opening defined by radial annular ledge 132 as well as the position of retention pins 444 relative to holes 125 in radial annular wall 128 of gland plate segments 110, assembly of a biasing ring segment 430 into a gland plate segment 110 requires that the ends 432 of the biasing ring segment 430 be tilted toward radial annular inboard facing reaction surface 129 in biasing chamber portion 127 in order to engage pins 444 in holes 125 in radial annular wall 128 and insert inboard facing radial wall 437 behind radial annular ledge 132. Once so installed, the axial force of compression coil springs 440 retains each biasing ring segment 430 within chamber portion 127 of the biasing ring segment 430 as a pre-assembled installation component. Notably, the truncated ends 432 permit tilting such that outer axial surface 431 of the biasing ring segment 430 clears ledge 132 as the outboard ends of pins 444 enter holes 125 in radial annular wall 128.

The inboard facing radial wall 437 of each biasing ring segment 430 includes an axial pin 448 positioned midway between transverse ends 432. As illustrated in FIG. 3, in the fully assembled condition of the split mechanical end face seal assembly 90, the pin 448 of each segment resides in the radial slot 338 of one of the segments of the primary seal ring 330 rendering the primary seal ring 330 non-rotatable relative to its associated biasing ring segment 430.

Each biasing ring segment 430 is fixed against rotation relative to gland plate assembly 100 by the disposition of retention pins 444 within holes 125 in radial wall 128 of body portion 114 of each gland plate segment 110. Notably, the holes 125 are sized to permit the pins 444 to slide freely permitting axial compression of springs 440 through inboard axial movement of gland plate assembly 100 toward outboard face 93 of housing 92 during installation of the split mechanical end face seal assembly 90 between housing 92 and shaft 91. Such axial movement occurs on engagement of inboard facing radial wall 437 with outboard radial annular face 337 of primary seal ring 330.

During installation of the split mechanical end face seal assembly 90, the axial position of mating seal ring sealing face 236 is set at a predetermined position relative to outboard face 93 of housing 92 and mating ring adapter assembly 250 secured to shaft 91. Primary seal ring sealing face 336 is placed in abutting engagement with mating ring sealing face 236. The gland plate segments 110, with biasing ring segments installed, are placed around primary seal ring assembly 300. Securement of bolts 139 causes axial movement of gland plate assembly 100 toward outboard face 93 of housing 92. Inboard facing radial wall 437 of biasing ring segments 430 separates from radial abutment surface 133 compressing coil springs 440. Such compression provides the desired axial preload urging primary seal ring sealing face 336 into sealing relation with sealing face 236 of mating seal ring 230.

Turning now, in particular, to FIGS. 4 and 5 details are described of the resilient connector strips 240 and the resilient axial and radial support of the segments of mating seal ring 230 to its associated mating ring adapter segment 251. Such connection provides the axial non-rigid support of mating seal ring 230 within the outboard facing counterbore of mating ring adapter assembly 250. As can be appreciated, each mating ring adapter segment 251 includes a retention groove 280 in which is disposed a section of resilient connector strip 240. The retention groove 280 and similarly, connector strip 240, extend in a semi-circular shape between transverse facing ends 252 of mating ring adapter segments 251. The strip 240 is somewhat longer than the semi-circular extent of the groove. Hence, the ends of the strip 240 in each segment extend beyond the transverse facing ends 252. On securement together of the mating ring adapter segments 251, these ends abut and deform to form a fluid tight joint at the transverse facing ends 252 of segments 251 of mating ring adapter assembly segments 250.

As seen in FIGS. 4 and 5, each resilient connector strip 240 is generally rectangular in cross-section. It includes an inboard radial annular face 260, an outboard radial annular face 264, an inward axial surface 266 and an outward axial surface 268. The flexibility is provided by the material of the resilient connector strip 240, which is selected to be elastically resilient. Appropriate types of material are also selected based on their resistance to the operating fluid of the seal environment, and can include elastomeric materials such as ethylene propylene (EPDM), fluorocarbon polymers and the like.

The inboard radial annular face 260 and the outward axial surface 268 join at a smooth radius 270. The inboard radial annular face 260 and the inward axial surface 266 are joined by an inward directed bead 262 that extends radially inward from inward axial surface 266. Bead 262 has a generally semi-circular cross-section.

The inward axial surface 266 and outboard radial annular face 264 are joined by an axial outboard extending bead 267 that extends axially outboard from outboard radial annular face 264. Bead 267 has a generally semi-circular cross-section.

Outboard radial annular face 264 and outward axial surface 268 are joined by an outboard directed rib 269 that extends outboard of outboard radial annular face 264.

One resilient connector strip 240 is connected to each mating ring adapter segment 251 within its semi-circular retention groove 280. As illustrated in FIG. 5, inboard radial annular face 260 resides against outboard facing radial annular wall 282 of mating ring adapter segment 251. Outward axial surface 268 resides against axially extending semi-cylindrical wall 284, with outboard directed rib 269 of resilient connector strip 240 captured within outboard notch 286 defined by shoulder 288 of mating ring adapter segment 251. The resilient connector strip 240 is sized such that it is somewhat compressed between the shoulder 288 and outboard facing radial annular wall 282. This relationship is adequate to provide a holding force sufficient to retain the resilient connector strip 240 within the retention groove 280.

As illustrated in FIG. 5, each resilient connector strip 240 is also resiliently attached to a segment of mating seal ring 230. Thus, each segment of mating seal ring 230 is axially and radially supported upon a mating ring adapter segment 251, with the interface 234 of mating seal ring 230 aligned with the transverse facing ends 252 of the associated mating ring adapter segment 251. Together the segments of mating seal ring 230 and associated segment 251 of mating ring adapter assembly 250 form installable sub-assemblies for installation. Once so installed about shaft 91, the resilient connector strips 240 provides axial non-rigid support for mating ring 230 within mating ring adapter assembly 250.

Resilient connector strip 240 is resiliently attached to mating seal ring 230 at radial outward axial cylindrical surface 242. The inward axial surface 266 of a resilient connector strip 240 rests on outward axial cylindrical surface 242 of a segment of mating seal ring 230. Outboard radial annular surface 264 of resilient connector strip 240 rests against inboard facing radial annular surface 243 of mating seal ring 230. Radially inward directed bead 262 of resilient connector strip 240 resides in inward directed axial capture groove 246 and axially outboard directed bead 267 resides in outboard directed radial capture groove 245. The resilient connector strip 240 is sized such that it is somewhat compressed between radial annular inboard facing surface 243 and the radially inward directed bead 262 disposed in radially inward directed axial capture groove 246. This relationship is adequate to provide a holding force sufficient to attach the resilient connector strip 240 to a segment of mating seal ring 230 at radially outward axial cylindrical surface 242. Each resilient connector strip 240 thus resiliently supports a segment of mating seal ring 230 within its associated mating ring adapter segment 251 and against accidental dislodgement prior to attachment of the mating ring assembly 200 to rotatable shaft 91. No adhesive is necessary to adhere the resilient connector strip 240 to the mating seal ring 230 or the segments 251 of mating ring adapter assembly 250.

It should be mentioned that the particular locations of the extending beads 262, 267 and rib 269 of resilient connector strip 240, the cooperating receptacles for these contours defined on the segments of mating seal ring 230 and mating ring adapter segments 251 are only illustrative and not limiting. These interconnection elements could be positioned elsewhere, for example, along the exterior defining surfaces 260, 264, 266 or 268 of resilient connector strip 240 with corresponding relocation of the cooperating elements of the mating seal ring 230 and mating ring adapter segments 251. The disclosed arrangement, in its broadest sense, is a resilient connector strip 240 resiliently affixed to a mating ring adapter segment 251 and a segment of mating seal ring 230 to secure the mating seal ring 230 against radial or axial dislodgement.

The split mechanical end face seal assembly 90 of the present disclosure may be installed between a housing 92 and a rotatable shaft 91 without access to the shaft end. It is particularly useful, therefore, in installations where the shaft is connected to a prime mover that cannot be conveniently removed. The installation process is simplified, and complete and proper installation assured by virtue of the various features of the split mechanical end face seal assembly 90 of the disclosure.

In particular, all resilient components, that is, the various resilient elastomeric sealing strips that perform a secondary sealing function are affixed in position on an associated component without the use of adhesives to provide a temporary connection. The securement bolts 235 for assembly of mating ring adapter segments 251 to form the mating ring adapter assembly 250 are carried by one mating ring adapter segment 251 with threaded ends resident in unthreaded counterbores 254. At assembly these bolts are threaded into threaded holes 255 of the other mating ring adapter segment 251. Thus, the bolts 235 are presented in one mating ring segment 251 for affixation to the other simplifying the assembly task.

Similarly, the securement bolts 135 of the gland plate assembly 100 are loosely secured to the transverse ends 109 of one gland plate segment 110 with threaded ends resident in unthreaded counterbores 105. On assembly, implementation access is necessary to only the gland plate segment 110 carrying the bolts 135 in order to fasten the bolts to the threaded holes 106 at the transverse ends 109 in the other gland plate segment 110.

A segment of mating seal ring 230 is resiliently retained, supported axially and radially, within the outboard facing counterbore of each mating ring adapter segment 251. Axial pin 272 of each segment 251 is disposed in a slot 238 of a segment of mating seal ring 230.

The resilient connector strip 240 is resiliently secured to the mating ring adapter segment 251 in retention groove or channel 280 by the interengagement of the inboard radial annular face 260 and outboard directed rib 269 of strip 240 with the outboard facing radial annular wall 282 and semi-circular shoulder 288 forming outboard notch 286 of retention groove 280. The resilient connector strip 240 is resiliently secured to the segment of mating seal ring 230 by the interengagement of the axially outboard directed bead 267 and radially inward directed bead 262 respectively with outboard directed radial capture groove 245 and inward directed axial capture groove 246. The mating ring adapter segment 251 and resiliently attached segment of mating seal ring 230 can readily be handled, installed and secured to the shaft 91 as connectable unitary components. As previously described, biasing assembly 400 is similarly configured with biasing ring segments 430 contained within associated segments 110 of the gland plate assembly 100.

Installation of the split mechanical end face seal assembly 90 is initiated with attachment of mating ring assembly 200 to shaft 91. The pre-assembled assembly of mating seal ring components comprises a segment 251 of mating ring adapter assembly 250, an elastomeric seal element 290, elastomeric sealing strip 259, and a segment of mating seal ring 230 resiliently supported on resilient connector strip 240. These two sub-assemblies are positioned about the shaft with the transverse ends 252 of one segment 251 facing the transverse ends 252 of the other segment. An appropriate spacing is established between the outboard face 93 of housing 92 and the outboard facing radial annular sealing face 236 of mating seal ring 230. This location may be set using disposable spacers (not shown) pre-assembled to the segments 251 of mating ring adapter assembly 250. The spacers contact outboard face 93 to set the appropriate distance. Bolts 235 of one mating ring adapter segment 251 are threaded into threaded holes 255 in the other mating ring adapter segment 251 to complete the mating ring adapter assembly 250. On such tightening of bolts 235 resilient seal element 290 seals transverse facing ends 252 of mating ring adapter segments 251. Also O-ring shaped elastomeric sealing strips 259 are compressed into a fluid tight seal against the shaft 91. Set screws 257 are then tightened to secure mating ring adapter assembly 250 to shaft 91.

Next, the segments of primary seal ring 230 are positioned around shaft 91 with inboard facing radial annular sealing face 336 in facing contact with the outboard radial annular sealing face 236 of mating seal ring 230. Retaining ring 350 is placed in the radial inward groove 242 of each segment of primary seal ring 330 to hold the primary seal ring segments together prior to installation of gland plate assembly 100.

The gland plate segments 110 with elastomeric seal elements 140 and O-ring shaped elastomeric sealing strips 126 in place are then placed in overlying relation to the primary seal ring assembly 300 and positioned with the inboard facing radial wall 437 of the biasing ring segments 430 in facing contact with the outboard radial annular face 337 of the segments of primary seal ring 330. Disposable plastic spacers (not shown) may be employed to center mating ring adapter assembly 250 about shaft 91. Also, care must be taken to insert the axial pin 448 of each semi-circular shaped biasing ring segment 430 into a radial slot 338 of one of the segments of primary seal ring 330. Chamfer 339 aids in proper insertion of pin 448.

With the transverse ends 109 of one segment 110 facing the transverse ends 109 of the other segment, bolts 135 carried by the first segment are threaded into the threaded holes 106 in the other segment 110 to complete the gland plate assembly 100. On such tightening of bolts 135 resilient seal element 140 seals transverse facing ends 109 of gland plate segments 110.

Also, the O-ring shaped elastomeric sealing strips 126 define a circular elastomeric seal with an internal diameter smaller than the outer diameter of the radially outer axially extending semi-cylindrical surface 340 of the segments of primary seal ring 330. Strips 126 thus provide a secondary sealing function between radially outer axially extending semi-cylindrical surfaces 340 of the segments of the axially moveable primary seal ring 330 and the gland plate segments 110.

Bolts 139 are inserted in slots 116 of the flange portion of gland plate segments 110. Tightening of bolts 139 causes inboard axial movement of gland plate assembly 100. As the gland plate assembly 100 moves axially inboard, radial annular wall 128 of the outboard end of the gland plate assembly 100 moves toward outboard radial annular face 337 of primary seal ring 330 causing compression of coil springs 440. Inboard facing radial wall 437 of semi-circular biasing ring segments 430 move away from radial abutment surface 133 of radial annular ledge 132. The axial force of compression coil springs 440 is thus imparted to the outboard radial annular face 337 of the primary seal ring 330 providing axial preload of inboard facing radial annular sealing face 336 of primary seal ring 330 into outboard facing radial annular sealing face 236 of mating seal ring 230.

Tightening of bolts 139 completes the installation process. O-ring shaped elastomeric sealing strips 119 in grooves 117 of gland plate segments 110 provide a static seal against outboard face 93 of housing 92. O-ring shaped elastomeric sealing strips 126 in semi-circular seal ring groove 124 of gland plate segments 110 are compressed radially against the radially outer axially extending cylindrical surface 340 of primary ring 330 and centralize primary ring assembly 300 about shaft 91.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally.

I claim:

1. A method for installing a split mechanical end face seal assembly between a rotatable shaft and a housing, having an outboard face, wherein said split mechanical end face seal comprises
    a gland plate assembly adapted to be disposed about the shaft and secured to an outboard face of the housing;
    a mating seal ring assembly adapted to be secured to a rotatable shaft in pre-determined relation to the outboard face of the housing, said mating seal ring assembly comprising:
    a segmented mating seal ring defining a radial annular sealing face;
    a mating ring adapter assembly comprising:
    mating ring adapter segments,
    resilient connector strips, each connected to a segment of said mating seal ring and a segment of said mating ring adapter resiliently axially and radially supporting each said mating seal ring segment upon a mating ring adapter segment,
    an axially movable primary seal ring assembly comprising:
    a segmented primary seal ring defining a radial annular sealing face disposed in face-to-face sealing relation with said radial annular sealing face of said mating seal ring;
    a biasing assembly urging said primary seal ring into face-to-face sealing relation with said mating seal ring,
    said resilient connector strips axially non-rigidly support said mating ring within said mating ring adapter assembly;
    said mating ring adapter segments each include a semi-circular retention groove;
    said segments of said mating seal ring each include a radial outward axial cylindrical surface;
    said resilient connector strip is resiliently connected to a segment of said mating ring adapter at said semi-circular retention groove and to a segment of said mating seal ring at said outward axial cylindrical surface;
    said semi-circular retention groove of each said mating ring adapter segment includes:
    an outboard facing radial annular wall;
    a semi-circular shoulder spaced axially outboard of said outboard facing radial annular wall, and
    said resilient connector strip is resiliently disposed between said outboard facing radial annular wall and said semi-circular shoulder;
    each said radial outward axial cylindrical surface of each said segment of said mating seal ring includes an inward directed axial capture groove extending radially inward therefrom, and an inboard facing radial annular face joined to said radial outward axial cylindrical surface outboard of said inward directed axial directed capture groove, by an outboard directed radial capture groove, and
    said resilient connector strip is resiliently disposed between said radially inward directed capture groove and said outboard directed capture groove;
    each said resilient connector strip includes an inboard radial annular face and an inward axial surface joined to said inboard radial annular face by an inward directed bead extending radially inward from said inward axial surface;
    each said resilient connector strip further includes an outboard radial annular face joined to said inward axial surface by an axial outboard bead extending axially outboard from said outboard radial annular face, and
    wherein said inward directed bead of said resilient connector strip resides in said inward directed axial capture groove of said mating seal ring segment and said axial outboard bead of said resilient connector strip resides in said outboard directed radial capture groove;
    said semi-circular retention groove of each said mating ring adapter segment includes an axially extending semi-cylindrical wall joined to said outboard facing radial annular wall, said axially extending semi-cylindrical wall forming an outboard notch with said semi-circular shoulder and each such resilient connector strip includes an outward axial surface joined to said outboard radial annular face by an outboard directed rib and wherein said outboard directed rib of said resilient connector strip is disposed in said outboard notch, said method comprising:
    installing said two mating seal ring adapter segments around the rotatable shaft, each said segment having said mating seal ring segment axially and radially resiliently mounted thereon by said resilient connector strips;
    installing said mating rings and said mating seal adapter segments axially along the rotatable shaft at a predetermined axial distance from a face of the housing;
    installing said two primary seal ring segments around the rotatable shaft to form a primary seal ring assembly;
    positioning the primary seal ring in sealing contact with the mating seal ring;
    pre-assembling segments of said segmented biasing assembly into segments of said gland plate assembly;
    installing said gland plate segments around the primary seal ring;
    aligning said two gland plate segments with anti-rotation features of said primary seal ring;
    fastening said two gland plate segments to one another around said primary seal ring to form said gland plate assembly; and
    sealably connecting the gland plate to the housing by urging said gland plate assembly toward said face of said housing to apply an axial preload of said biasing assembly to said primary ring assembly.

2. The method of claim 1, wherein the axially and radially resilient engagement between the mating seal ring and the mating seal ring adapter segments is accomplished by providing said resilient connector strip engaging surfaces defined along the mating seal ring adapter segments and an outer portion of the mating seal ring segments.

3. The method as claimed in claim 2 further comprising axially non-rigidly supporting said mating ring segments in said mating ring assembly of said split mechanical end face seal assembly.

4. A split mechanical end face seal assembly for installation between a housing and rotatable shaft comprising:
    a gland plate assembly adapted to be disposed about the shaft and secured to an outboard face of the housing;

a mating seal ring assembly adapted to be secured to a rotatable shaft in pre-determined relation to the outboard face of the housing, said mating seal ring assembly comprising:
a segmented mating seal ring defining a radial annular sealing face;
a mating ring adapter assembly comprising:
mating ring adapter segments,
resilient connector strips, each connected to a segment of said mating seal ring and a segment of said mating ring adapter resiliently axially and radially supporting each said mating seal ring segment upon a mating ring adapter segment,
an axially movable primary seal ring assembly comprising:
a segmented primary seal ring defining a radial annular sealing face disposed in face-to-face sealing relation with said radial annular sealing face of said mating seal ring;
a biasing assembly urging said primary seal ring into face-to-face sealing relation with said mating seal ring;
said resilient connector strips axially non-rigidly support said mating ring within said mating ring adapter assembly;
said mating ring adapter segments each include a semi-circular retention groove;
said segments of said mating seal ring each include a radial outward axial cylindrical surface;
said resilient connector strip is resiliently connected to a segment of said mating ring adapter at said semi-circular retention groove and to a segment of said mating seal ring at said outward axial cylindrical surface;
said semi-circular retention groove of each said mating ring adapter segment includes:
an outboard facing radial annular wall;
a semi-circular shoulder spaced axially outboard of said outboard facing radial annular wall, and
said resilient connector strip is resiliently disposed between said outboard facing radial annular wall and said semi-circular shoulder;
each said radial outward axial cylindrical surface of each said segment of said mating seal ring includes an inward directed axial capture groove extending radially inward therefrom, and an inboard facing radial annular face joined to said radial outward axial cylindrical surface outboard of said inward directed axial directed capture groove, by an outboard directed radial capture groove, and
said resilient connector strip is resiliently disposed between said radially inward directed capture groove and said outboard directed capture groove;
each said resilient connector strip includes an inboard radial annular face and an inward axial surface joined to said inboard radial annular face by an inward directed bead extending radially inward from said inward axial surface;
each said resilient connector strip further includes an outboard radial annular face joined to said inward axial surface by an axial outboard bead extending axially outboard from said outboard radial annular face, and
wherein said inward directed bead of said resilient connector strip resides in said inward directed axial capture groove of said mating seal ring segment and said axial outboard bead of said resilient connector strip resides in said outboard directed radial capture groove;
said semi-circular retention groove of each said mating ring adapter segment includes an axially extending semi-cylindrical wall joined to said outboard facing radial annular wall, said axially extending semi-cylindrical wall forming an outboard notch with said semi-circular shoulder and each such resilient connector strip includes an outward axial surface joined to said outboard radial annular face by an outboard directed rib and wherein said outboard directed rib of said resilient connector strip is disposed in said outboard notch.

5. A split mechanical end face seal assembly as claimed in claim 4 wherein said gland plate assembly includes gland plate segments defining a biasing chamber portion having an outboard radial annular wall;
said biasing assembly includes a biasing ring segment in each said biasing chamber portions of each said gland plate segment, compression springs between said outboard radial wall and said gland plate segments urging said segments toward said primary ring segments.

6. A split mechanical end face seal assembly as claimed in claim 5 wherein said biasing ring segments each include an outboard facing radial wall and an inboard facing radial wall; said outboard radial annular wall of said biasing chamber portion includes an annular inboard facing reaction surface, and said compression springs being a plurality of compression coil springs extending between said inboard facing reaction surface and each said biasing ring segment.

7. A split mechanical end face seal assembly as claimed in claim 6 wherein said outboard radial annular wall of each said gland plate segment includes at least one hole therein, each said biasing ring segment has a truncated semi-circular shape with transverse ends spaced apart from each other and wherein each said biasing ring segment includes at least one outboard extending retention pin extending outboard of said outboard facing radial wall, said at least one pin is slidably disposed in said at least one hole in said outboard radial annular wall of said gland plate segment.

8. A split mechanical end face seal assembly is claimed in claim 7 wherein said outboard radial annular wall of each said gland plate segment includes two holes and each said biasing ring segment includes two outboard extending pins extending outboard of said outboard facing radial wall each said pin slidably disposed in one of said holes in said outboard radial annular wall of said gland plate segment.

9. A split mechanical end face seal assembly as claimed in claim 7 wherein each said segments of said primary seal ring includes transverse ends, and an outboard annular face having a radial slot therein, midway between its transverse ends, and wherein each said biasing ring segment includes an axial pin residing in a slot of one of said segments of said primary seal ring.

10. A split mechanical end face seal assembly as claimed in claim 9 wherein each said gland plate segment defines a seal ring groove and each said segments of said primary seal ring include a radially outer axially extending semi-cylindrical surface and said gland plate assembly includes a resilient elastomeric sealing strip disposed in said groove in radial sealing contact with said radially outer axially extending semi-cylindrical surface of said primary seal ring.

11. A split mechanical end face seal assembly as claimed in claim 10 wherein each said gland plate segment includes an annular ledge defining a radial abutment surface outboard of said seal ring groove, each said biasing ring segment disposed between said radial abutment surface and said outboard radial annular wall of each said gland plate segment with said inboard facing radial wall of said biasing ring segment engageable with said radial abutment surface.

12. A split mechanical end face seal assembly as claimed in claim 4 wherein said gland plate assembly includes gland plate segments defining a biasing chamber portion having an outboard radial annular wall;

said biasing assembly includes a biasing ring segment in each said biasing chamber portions of each said gland plate segment, compression springs between said outboard radial wall and said gland plate segments urging said segments toward said primary ring segments.

13. A split mechanical end face seal assembly as claimed in claim 12 wherein said biasing ring segments each include an outboard facing radial wall and an inboard facing radial wall;

said outboard radial annular wall of said biasing chamber portion includes an annular inboard facing reaction surface, and a plurality of compression coil springs extending between said inboard facing reaction surface and each said biasing ring segment.

14. A split mechanical end face seal assembly as claimed in claim 13 wherein said outboard radial annular wall of each said gland plate segment includes at least one hole therein, each said biasing ring segment has a truncated semi-circular shape with transverse ends spaced apart from each other and wherein each said biasing ring segment includes at least one outboard extending retention pin extending outboard of said outboard facing radial wall, said at least one pin is slidably disposed in said at least one hole in said outboard radial annular wall of said gland plate segment.

15. A split mechanical end face seal assembly as claimed in claim 14 wherein each said segments of said primary seal ring includes transverse ends, and an outboard annular face having a radial slot therein, midway between its transverse ends, and wherein each said biasing ring segment includes an axial pin residing in a slot of one of said segments of said primary seal ring.

16. A split mechanical end face seal assembly as claimed in claim 15 wherein each said gland plate segment defines a seal ring groove and each said segments of said primary seal ring include a radially outer axially extending semi-cylindrical surface and said gland plate assembly includes a resilient elastomeric sealing strip disposed in said groove in radial sealing contact with said radially outer axially extending semi-cylindrical surface of said primary seal ring.

17. A split mechanical end face seal assembly as claimed in claim 16 wherein each said gland plate segment includes an annular ledge defining a radial abutment surface outboard of said seal ring groove, each said biasing ring segment disposed between said radial abutment surface and said outboard radial annular wall of each said gland plate segment with said inboard facing radial wall of said biasing ring segment engageable with said radial abutment surface.

* * * * *

UNITED STATES PATENT AND TRADEMARK OFFICE
CERTIFICATE OF CORRECTION

| | | |
|---|---|---|
| PATENT NO. | : 8,651,494 B2 | Page 1 of 1 |
| APPLICATION NO. | : 13/047485 | |
| DATED | : February 18, 2014 | |
| INVENTOR(S) | : David M. Dudek | |

It is certified that error appears in the above-identified patent and that said Letters Patent is hereby corrected as shown below:

In the Claims

Claim 2 at column 14, line 56, "by providing said" should read --by said--

Signed and Sealed this
Thirtieth Day of December, 2014

Michelle K. Lee
*Deputy Director of the United States Patent and Trademark Office*